United States Patent [19]
Neufeld et al.

[11] Patent Number: 5,971,434
[45] Date of Patent: Oct. 26, 1999

[54] LATCH MECHANISM FOR A PROTECTIVE STRUCTURE OF A SKID STEER LOADER

[75] Inventors: Sidney B. Neufeld, Wichita; Gary D. Stromberg, Derby, both of Kans.

[73] Assignee: Case Corporation, Racine, Wis.

[21] Appl. No.: 08/812,975

[22] Filed: Mar. 5, 1997

[51] Int. Cl.⁶ ................................................. B60R 21/13
[52] U.S. Cl. .......................................................... 280/756
[58] Field of Search ........................... 280/756; 180/271, 180/272, 286, 289, 273; 292/139, 143, 186, 188

[56] References Cited

U.S. PATENT DOCUMENTS

| | | | |
|---|---|---|---|
| 4,362,220 | 12/1982 | Baston | 280/756 |
| 5,042,835 | 8/1991 | Burns | 280/756 |

FOREIGN PATENT DOCUMENTS

| | | | |
|---|---|---|---|
| 1814976 | 7/1969 | Germany | 280/756 |
| 286515 | 3/1928 | United Kingdom | 292/139 |

*Primary Examiner*—Eric Culbreth
*Attorney, Agent, or Firm*—Mayer, Brown & Platt

[57] ABSTRACT

A latch mechanism for releasably locking a cab enclosure or rollover protective structure to a frame of a skid steer loader. The protective structure is mounted to the frame of the skid steer loader for pivotal movement between operational and nonoperational positions. The latch mechanism of the present invention is a multipiece assembly including first and second subassemblies. The first subassembly is arranged on either the frame or the protective structure in spaced relation from that end about which the protective structure pivots. The second subassembly is mounted before cooperating and releasable engagement with the first subassembly and is mounted on either the frame or the protective structure on which the first subassembly is not mounted. In a first operating condition, the first and second subassemblies are operably engagable with each other to inhibit pivotal movement of the protective structure relative to the frame. In a second operating condition, the first and second subassemblies are operably disengaged from each other without the use of tools to permit the protective structure to be pivotally moved relative to the frame of the loader.

46 Claims, 4 Drawing Sheets

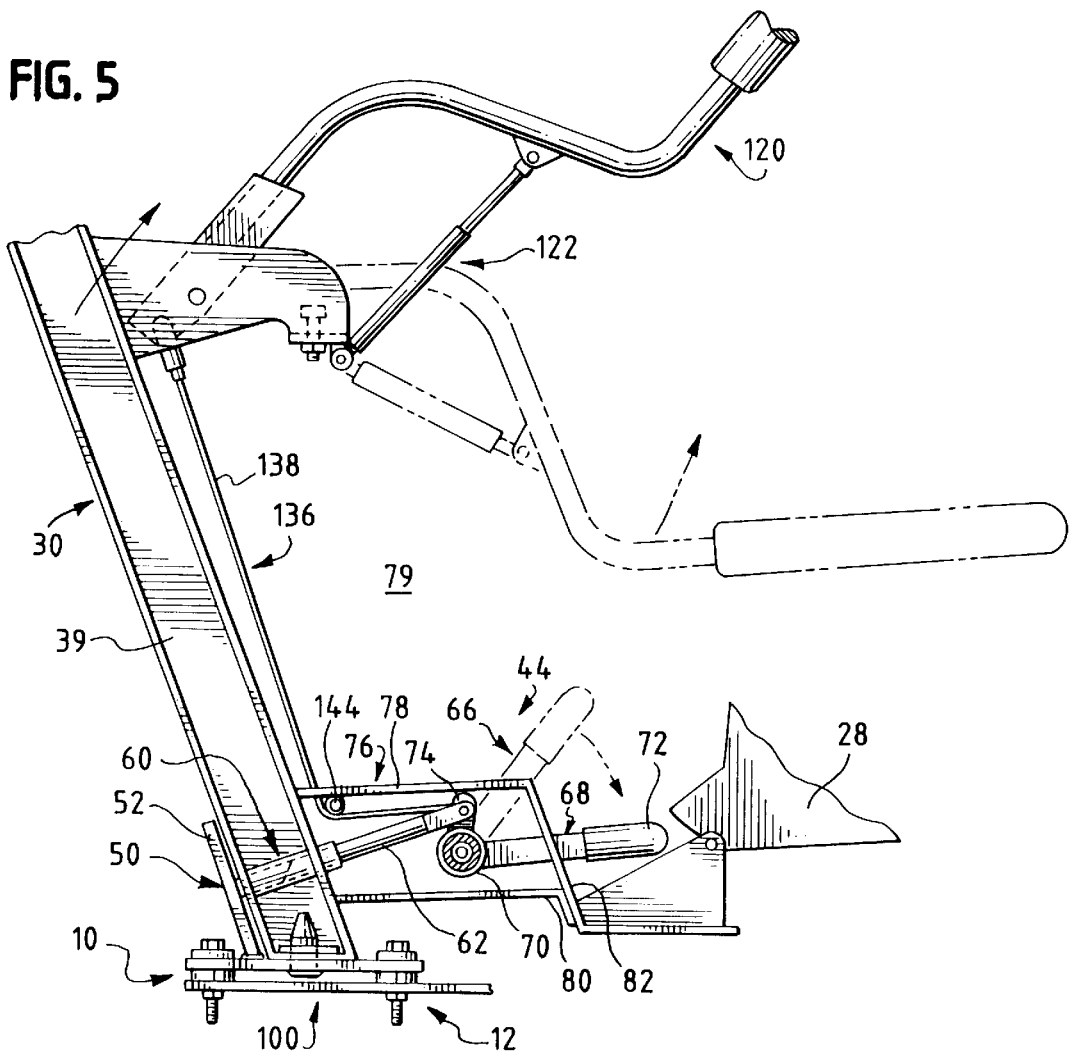

LATCH MECHANISM FOR A PROTECTIVE STRUCTURE OF A SKID STEER LOADER

FIELD OF THE INVENTION

The present invention generally relates to skid steer loaders and, more particularly, to a mechanism for releasably locking a protective structure to a frame of the skid steer loader without requiring the use of tools.

BACKGROUND OF THE INVENTION

Skid steer loaders typically include a compact mobile fore-and-aft extending frame having an engine compartment adjacent a rear end of the frame and an operators compartment provided intermediate opposed sides of the machine. Such machines furthermore include a front end loader such as material handling bucket supported for pivotal movement about a transverse axis at a forward end of a lift boom including a pair of lift arms extending along opposite sides of the frame.

In machines of this type, some form of cab enclosure or protective structure is arranged in surrounding relation relative to the operator's compartment and typically extends over a drive train of the machine including the engine and transmission. A significant problem arises, however, because the cab enclosure, when in an operational position relative to the skid steer loader frame, prevents free access into those areas of the machine enclosed by the cab enclosure but which often require repair and/or daily maintenance.

In earlier models, the cab enclosure or protective structure was detachably secured to the skid steer loader frame. Thus, a significant amount of time was involved to completely remove the cab enclosure from the frame to enhance access to areas on the machine normally inaccessible with the cab enclosure in an operative position relative to the frame.

Certain improvements have been made to the cab enclosure of such machines. Today, the cab enclosure of a skid steer loader is typically secured to the frame of the skid steer loader for pivotal or rotational movement of the cab enclosure about a horizontal axis extending transverse to the longitudinal axis of the frame of the skid steer loader. Such design allows the cab enclosure to be raised to a tilt-back or nonoperational position thus providing a technician with service access to those components and areas of the machine normally inaccessible when the protective structure is secured to the frame.

While one end of the cab enclosure is secured by the pivot or rotational mechanism allowing for pivotal movement of the cab enclosure to a tilt back position, the other end of the cab enclosure tends to bounce or vertically move as the skid steer loader is driven over uneven or bumpy terrain. Moreover, the cab enclosure tend to tilt about the pivot when the loader is driven across steeply sloped terrain. In an attempt to solve this problem, elongated bolts and threaded nuts have been used to secure opposite end of the protective structure to the frame of the loader. When the cab is to be rotated out of the way, however, the operator or service technician is required to find the right tools to undo the bolts and nuts used to secure the cab enclosure to the frame. As often happens, the bolt and nut on one side of the machine may be different sizes than those on the opposite side. Accordingly, valuable time is lost in obtaining the correct tools for releasing the securement of the cab enclosure to the frame of the loader. Moreover, a problem results when either the bolt or nut is misplaced or lost and thus further valuable time is lost in attempting to find or replace the misplaced or lost parts.

Thus, there is a need and a desire for a mechanism allowing the cab enclosure of a skid steer loader to be releasably secured to the frame and which does not require the use of tools to move the cab enclosure from an operational position to a nonoperational or tilt back position relative to the frame of the loader.

SUMMARY OF THE INVENTION

In view of the above, and in accordance with the present invention, there is provided a latch mechanism for releasably locking a cab enclosure, rollover protective structure to a fore-and-aft extending frame of a skid steer loader. A first end of the protective structure is mounted to the frame of the skid steer loader for pivotal movement between an operational position, wherein the protective structure is arranged in substantially adjacent relation relative to the frame and in surrounding relation relative to an operator area of the loader, and a nonoperational or tilted position, wherein the protective structure is positioned to enhance accessibility to those portions of the loader normally inaccessible when the protective structure is in an operational position. The latch mechanism of the present invention is a multipiece assembly including first and second subassemblies. The first subassembly is arranged on either the frame or the protective structure in spaced relation from that end about which the protective structure pivots. The second subassembly is mounted before cooperating and releasable engagement with the first subassembly and is mounted on either the frame or the protective structure on which the first subassembly is not mounted. In a first operating condition, the first and second subassemblies are operably engagable with each other to inhibit pivotal movement of the protective structure relative to the frame. In a second operating condition, the first and second subassemblies are operably disengaged from each other without the use of tools to permit the protective structure to be pivotally moved relative to the frame of the loader.

The first subassembly of the latch mechanism includes a latch preferably attached to the frame of the skid steer loader exteriorly or externally of a second and of the protective structure. The latch defines a stopping surface thereon. The second subassembly of the latch mechanism includes a locking element having an engaging surface, engagable with the stopping surface on the latch when the cab enclosure moves toward the second position and the latch mechanism is in its first operating condition. In a preferred form of the invention, the locking element is mounted for endwise sliding movement such that when the latch mechanism is in its first operating condition, the engaging surface of the locking element engages with the stopping surface on the latch. When the latch mechanism is in its second operating condition, the engaging surface of the locking element is remotely disposed relative to the stopping surface, thereby permitting movement of the protective structure relative to the frame of the loader.

According to a further aspect of the present invention, the latch mechanism includes an actuator for controlling the locked condition of the latch mechanism. In a preferred form, the actuator includes an operator controlled lever operably connected to the locking element of the latch mechanism. The latch mechanism further includes an apparatus for releasably holding the actuator in a predetermined position to inhibit inadvertent movement of the locking element and thereby inhibiting inadvertent displacement of the cab enclosure or protective structure from its first position adjacent the frame of the skid steer loader.

In a preferred form, the skid steer loader includes a seat bar arranged in the operator area of the loader. The seat bar is interconnected to various control functions on the machine such as loader controls, transmission controls and parking brake and is movable between operating and nonoperating positions. With the seat bar in an operational position, the various control functions on the machine are enabled. In contrast, with the seat bar in a raised on nonoperational position, the various control functions on the machine are disabled. Another aspect of the present invention relates to having the latch mechanism be responsive to movement of the seat bar. That is, besides enabling the various control functions on the machine, the latch mechanism of the present invention is urged into a locked conditioned when the seat bar of the loader is moved into its operational position.

As the protective structure moves into an operational position relative to the frame of the loader, it can often be laterally misaligned relative to the frame of the loader. Accordingly, the component assemblies comprising the latch mechanism may not interlock relative to each other until alignment is effected. In this respect, another aspect of the present invention relates to a mechanism for effecting lateral alignment of the protective structure relative to the frame, thereby promoting proper operation of the subassemblies of the latch mechanism when the protective structure is returned to an operational position relative to the frame of the loader.

To add strength and rigidity thereto, the rollover protective structure includes a pair of interconnected vertical roll bars at opposite rear corners. In a preferred form of the invention, the mechanism for effecting lateral alignment of the protective structure relative to the frame of the loader includes dual cams arranged towards opposite rear corners of the protective structure for guiding the vertical roll bars of the protective structure into position relative to the frame of the loader. The dual cams each include a guide upwardly projecting from and affixedly secured to the frame of the skid steer loader. A cooperative surface arranged toward a lower end of the roll bar is slidably accommodated for endwise movement over the guide. In a most preferred form of the invention, a free end of each guide is configured to promote guiding movement of a respective cooperative surface there past.

These and other objects aims in advantages of the present invention will be readily apparent from the following detailed description, the appended claims, and the accompanying drawings.

BRIEF DESCRIPTION OF THE DRAWINGS

FIG. 5 is a view similar to FIG. 3 but showing the latch mechanism is a released position;

FIG. 6 is a perspective view of one form of latch mechanism according to the present invention;

DESCRIPTION OF THE PRESENT INVENTION

Figure 1:
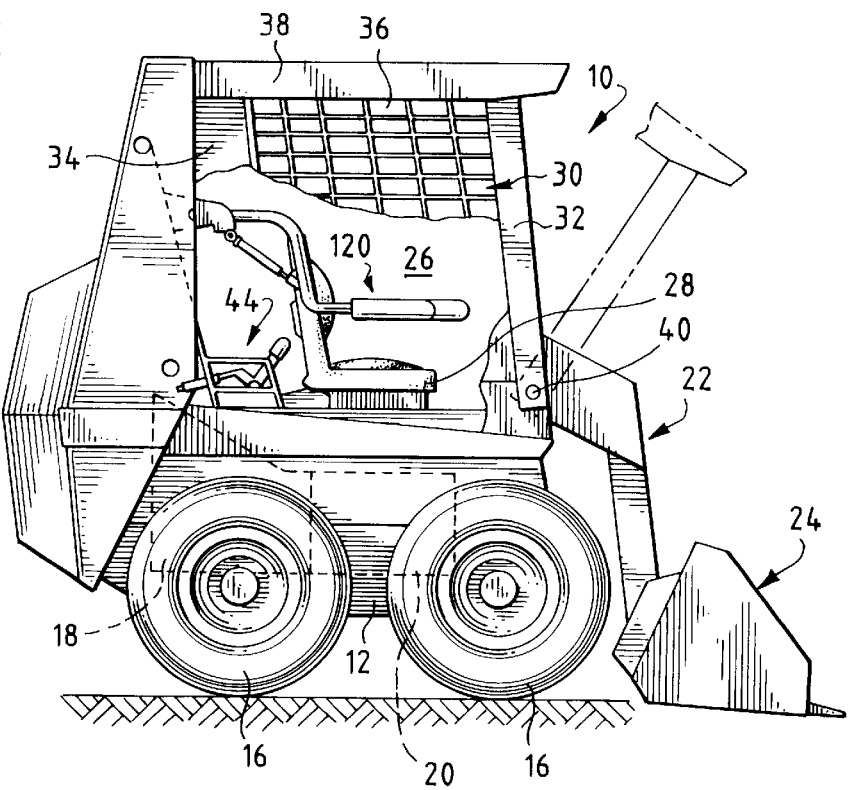
FIG. 1 is a side elevation view of a skid steer loader embodying principles of the present invention.

While the present invention is susceptible of embodiment in various forms, there is shown in the drawings a presently preferred embodiment of the invention which is hereinafter described, with the understanding that the present disclosure is to be considered as an exemplification of the invention, which is not intended to limit the invention to the specific embodiment illustrated.

Referring now to the drawings, wherein like reference numerals indicate like parts throughout the several views, there is shown in FIG. 1 a skid steer loader generally indicated by reference numeral 10. As is known, loader 10 includes a mobile fore-and-aft elongated frame 12 supported for over-the-ground travel by a plurality of wheels 16. Loader 10 includes a power train including a self-propelled engine 18 and transmission 20 combination. As shown, the loader frame 12 has a boom assembly 22 articulately connected thereto with a bucket 24 mounted to a forward end of the boom assembly 22.

The loader 10 further includes an operator station 26 defined by an operator seat 28 from whence various functions of the machine 10 are controlled. That is, control of engine 18, transmission 20, the loader boom assembly 22, and other functions of loader 10 are effected from the operator station 26. A cab enclosure 30, referred to also as a roll-over protective device, is arranged in surrounding relation relative to the operator station 26 and provides roll-over protective capability for the loader 10.

The cab enclosure or protective structure 30 preferably has the shape of an inverted open box and includes front and rear ends or portions 32 and 34, respectively, opposed side portions 36 all interconnected to each other by a top section or roof 38. Each vertical corner of the protective structure 30 preferably includes a hollow roll-bar or column 39 (FIG. 2) to add strength and rigidity to the cab enclosure 30. As is conventional, the protective structure 30 is pivotally mounted to the frame 12 by generally aligned pivot pins 40 defining a pivot axis extending transversely across the frame 12 of the machine 10. In the illustrated form of the invention, the pivot pins 40 are arranged toward the front end 32 of the pivot structure. It will be appreciated, however, that the teachings of the present invention equally apply to protective structure or cab enclosures 30 that pivot about the rear end 34 thereof.

As will be appreciated, the protective structure 30 is movable from an operating position shown in solid lines in FIG. 1, wherein the protective structure 30 is arranged adjacent to the frame 12 of the loader 10. That is, the protective structure 30 is movable from the position shown in FIG. 1 to a nonoperational or tilted position, shown in dotted lines in FIG. 1, and wherein the cab enclosure or protective structure 30 is disposed to enhance access to portions of the frame 12 substantially inaccessible when the protective structure 30 is in its operating position. Suitable drivers (not shown) may be disposed between the frame 12 of the loader 10 and the protective structure 30 to assist in moving the protective structure 30 about its pivot axis and between positions.

Figure 2:
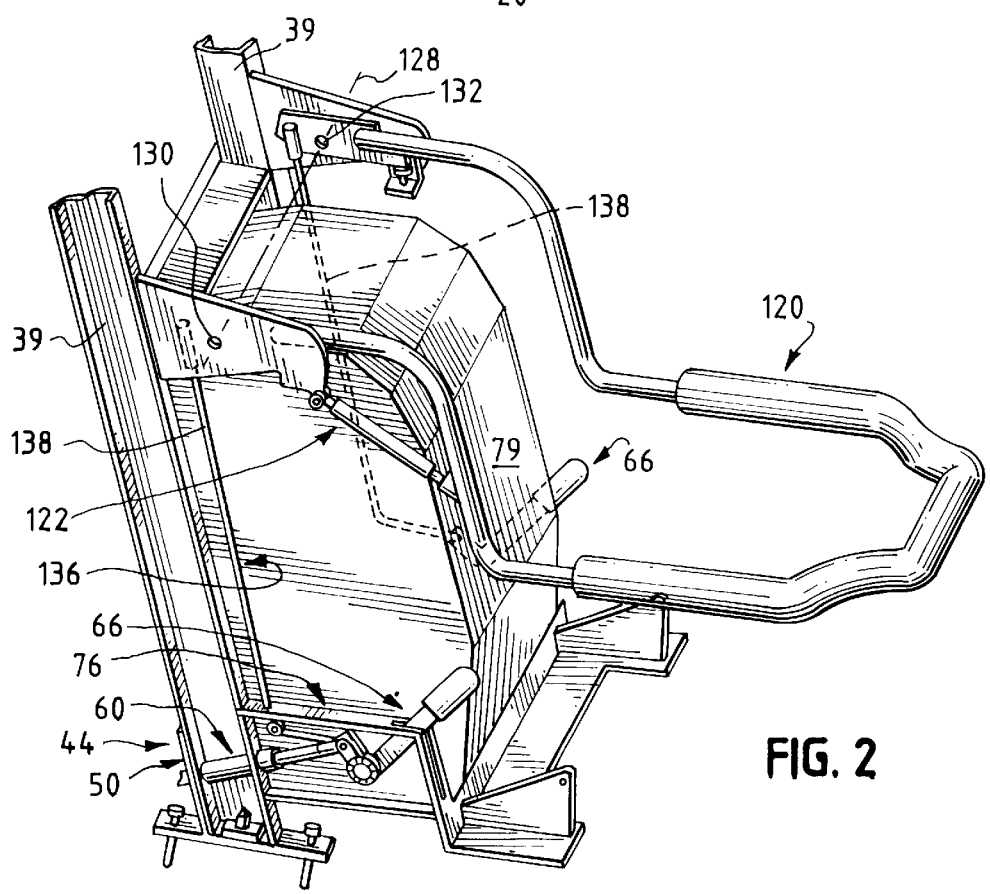
FIG. 2 is a perspective view of the skid steer loader with a portion of a cab enclosure broken away to review details of an operator station.
Figure 3:
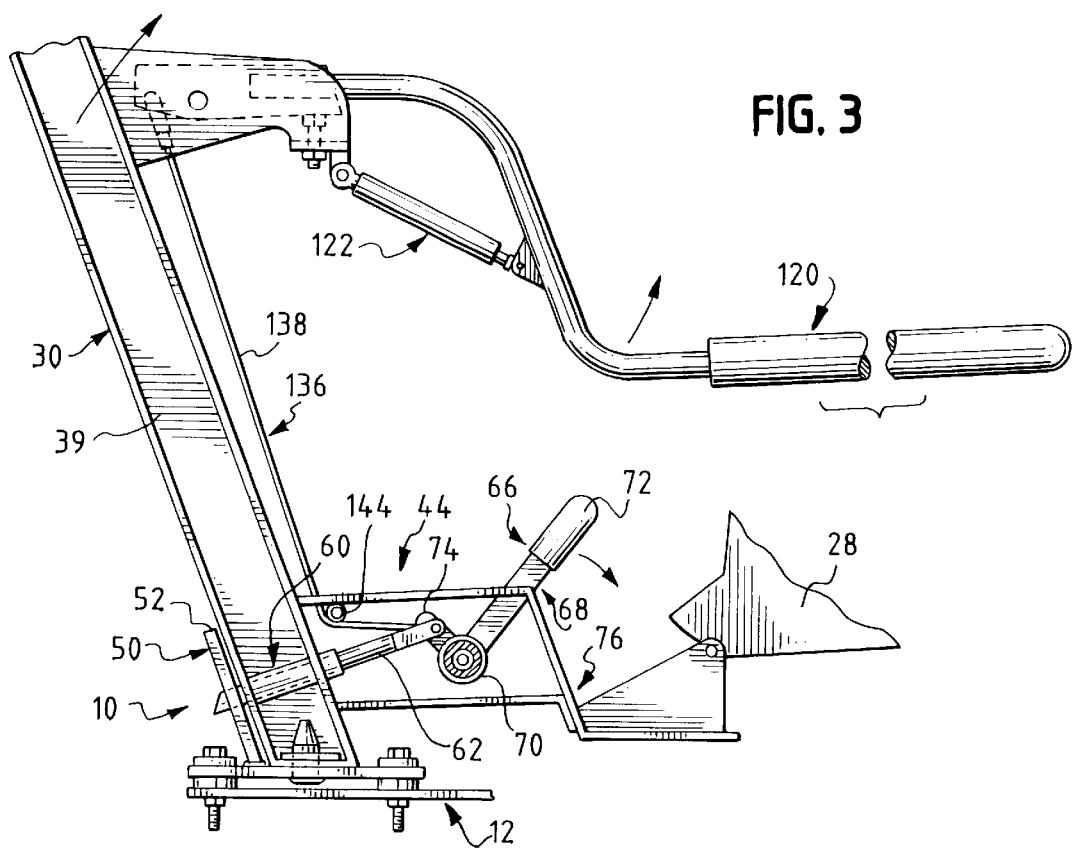
FIG. 3 is an enlarged side elevational view of one form of latch mechanism according to the present invention.

As shown in FIGS. 2 and 3, a latch mechanism 44 is provided for releasably locking the cab enclosure or protective structure 30 in an operational position relative to the frame 12 of the loader 10. The latch mechanism 44 is arranged in spaced relation from that end of the protective structure 30 pivotally attached to the frame 12. In the illustrated form of the invention, the latch mechanism 44 includes a pair of lock assemblies mounted on opposite sides of the frame 12 since there is no way to know or anticipate in what direction that machine 10 may tend to roil in response to forces applied thereto. Moreover, providing two separate lock assemblies arranged adjacent the corners of the cab enclosure 30 allows the cab enclosure 30 to act as a four-post structure when the cab enclosure is releasably locked to the frame 12 of the machine 10. Since the lock assemblies disposed on opposite sides of the frame 12 for releasably locking the protective structure 30 to the frame 12 are substantially identical relative to each other, only one lock assembly or mechanism will be shown and described in detail with the understanding that the description will likewise refer to an identical set of elements located on the opposite side of the frame 12.

Figure 4:
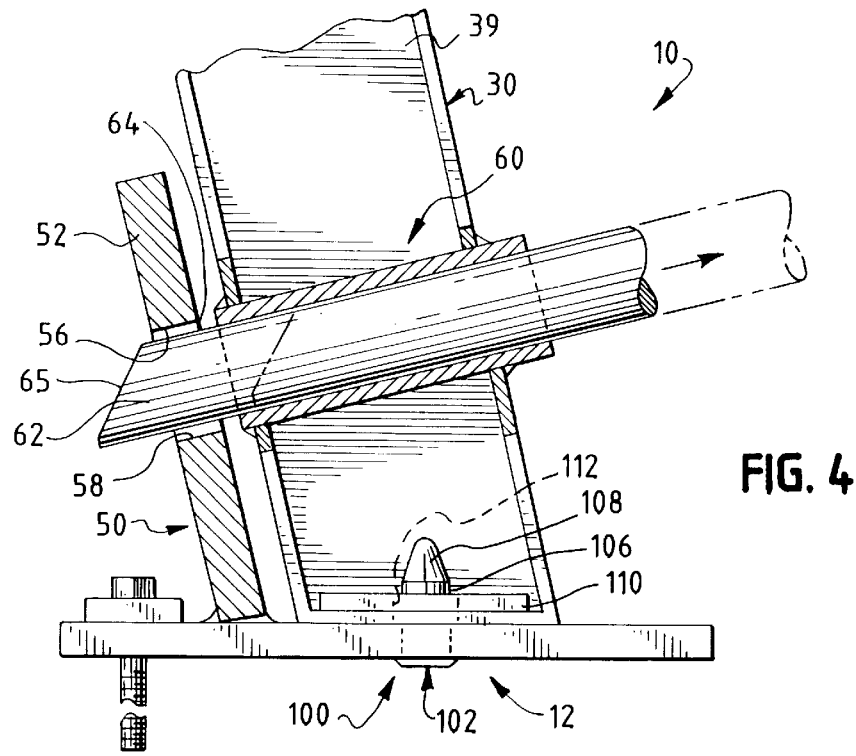
FIG. 4 is an enlarged longitudinal sectional view of a portion of the latch mechanism of the present invention.

As shown in FIGS. 3 and 4, each lock assembly of the latch mechanism 44 preferably includes a first subassembly 50 arranged on the frame 12 of the loader 10 in spaced relation from that end of the protective structure 30 pivotally attached to the frame 12, and a second subassembly 60 arranged for cooperative and releasable engagement with the first subassembly 50. The first subassembly 50 includes a latch 52 fixedly secured and extending upwardly from the frame 12 of the loader exteriorly or externally of the cab enclosure. Notably, the latch 52 extends generally parallel to a rear corner post 39 of the cab enclosure 30. As shown in FIG. 4, each latch 52 defines a stopping surface 56 thereon. In a most preferred form of the invention, each latch 52 defines a throughbore 58 with stopping surface 56 being formed as an integral part thereof.

The second subassembly 60 of each lock assembly includes a locking element 62. In the illustrated form of the invention, locking element 62 is mounted on the cab enclosure 30 and, therefore, traverses a fixed path of movement when the cab enclosure is moved between positions. As shown in FIG. 4, the locking element 62 has an engaging surface 64. As shown, the locking element 62 is mounted for endwise sliding movement between a first position shown in solid lines in FIG. 4, wherein the stopping surface 56 on latch 52 lies in the path of the engaging surface 64 of the locking element 62 thereby preventing substantial vertical movement of the cab enclosure 30 relative to the frame 12 of the loader. The locking element 62 is movable to a second position, shown in dotted lines in FIG. 4, wherein the engaging surface 64 of locking element 62 is remotely disposed relative to the stopping surface 56 on latch 52 thereby permitting movement of the cab enclosure 30 toward a tilted position. Preferably, a leading end of the locking element 62 is configured with a slanting or camming surface 65 to promote passage of locking element 62 through bore or opening 58 of latch 52 when the cab enclosure 30 is secured to frame 12. Notably the locking element 62, albeit movable relative to latch 52, remains associated with the cab enclosure 30 thus avoiding the problem of lost parts.

Each lock of latch mechanism 44 further includes an actuator 66 for moving the locking element 62 between locked and unlocked positions. As shown in FIG. 3, actuator 66 includes a lever 68 pivotally mounted on the cab enclosure and having the locking element 62 connected thereto. In the illustrated embodiment, lever 68 has a dog leg shape with a center portion 70 of lever 68 being pivotally secured to an adjacent side section 36 of cab enclosure 30. Lever 68 further includes a first end 72 disposed for operation from the operator seat 28 of the loader 10 and a second end 74 articulately connected to locking element 62. As such, pivotal movement of lever 68 results in endwise displacement of the locking element 62 along its fixed path of travel and relative to latch 52.

As shown in FIGS. 2, 3, 5 and 6 the actuator 66 for each lock assembly is preferably protectively arranged within an enclosure 76 carried on the cab enclosure 30. For purposes of clarity and to facilitate an understanding of the present invention, the side portions 36 of the cab enclosure have been removed from the area of the actuator in FIGS. 2, 3, 5 and 6 to facilitate an understanding of the present invention.

As shown in FIGS. 5 and 6, enclosure 76 preferably includes a top wall 78 projecting forwardly from and rigidly secured to the rear corner post 39 and to a rear panel 79 (shown in FIG. 2) of the cab enclosure. Enclosure 76 further includes a bottom wall 80 extending generally parallel to the top wall 78 and projecting from and rigidly secured to the rear corner post 39 and to the rear panel 79 of the cab enclosure. A front wall 82 rigidly joins the top and bottom walls 78 and 80, respectively. Notably, the forward end 72 of lever 68 projects through a detented slot 84 (FIG. 6) formed in the top and front walls 78 and 82, respectively, of the enclosure 76.

Figure 7:
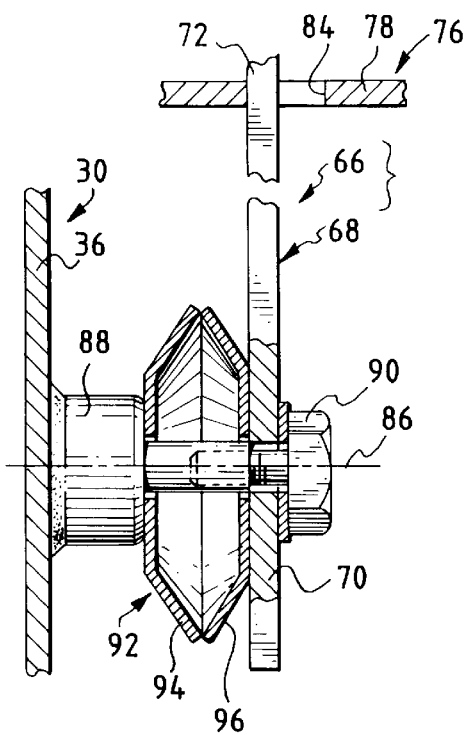
FIG. 7 is a sectional view taken along line 7—7 of FIG. 6.

According to a preferred form of the present invention, the pivot lever 68 is releasably held in a predetermined position to inhibit inadvertent movement of the locking element 62 thereby inhibiting inadvertent displacement of the cab enclosure from its operating position arranged adjacent the frame 12 of the skid steer loader 10. As shown in FIG. 7, lever 68 is pivotally mounted for rocking fore-and-aft movement about an axis 86 defined by a mount 88 extending away and generally normal to a side panel or section 36 of cab enclosure 30. A suitable fastener 90 pivotally secures the midsection 70 of lever 68 to the mount 88. A spring mechanism 92, preferably including a pair of Bellville springs 94 and 96, arranged in confronting relation relative to each other, urges the free end 72 of lever 68 in a predetermined direction wherein the lever 68 is normally entrapped within the detent portion of slot 84. Notably, the detented or staggered configuration of slot 84 will prevent inadvertent pivotal displacement of the lever 68 to an extent whereby the locking element 62 would be released from its respective latch 52.

Figure 8:
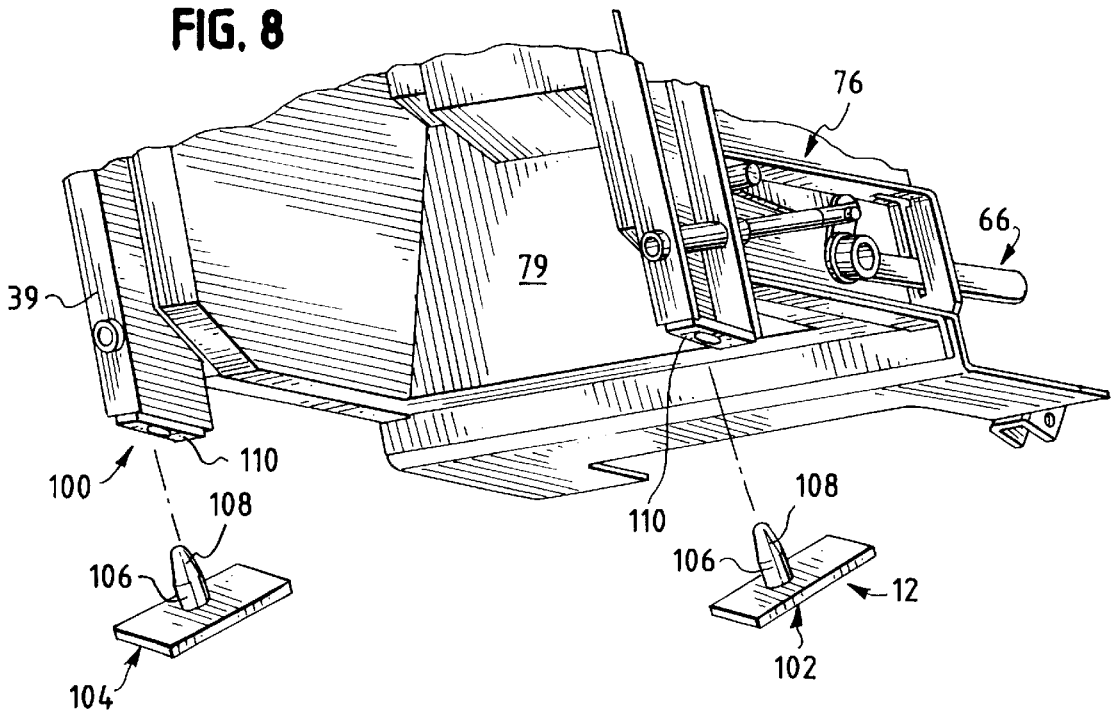
FIG. 8 is a perspective view looking from beneath and forwardly at the latch mechanism of the present invention.

Another aspect of the present invention relates to structure 100 for guiding the cab enclosure 30 into position relative to the frame 12 of the loader 10 when the cab enclosure 30 returns to its operative position. As shown in FIG. 8, structure 100 preferably includes first and second cam structures 102 and 104. Since the cam structures 102 and 104 are substantially identical, only cam structure 102 will be discussed in detail with the understanding that cam structure 104 is substantially identical thereto.

As shown in FIG. 4, each cam structure includes a guide 106 upwardly projecting from and fixedly secured to the frame 12 of the loader 10. Each guide 106 preferably has a cylindrical configuration along its length, at its free end, each guide 106 preferably has a conical surface 108 such that each guide 106 has an outer surface that decreases in diameter as it approaches the free end thereof. As shown, the lower end of each corner post 39 has a flat plate 110 extending thereacross. Each plate 110 is preferably formed of rigid metal material and defines an aperture 112 thereon. As will be appreciated, the internal periphery of the aperture 112 cooperates with the external surface of the guide 106 to positively position the cab structure relative to the frame 12 of the loader 10.

In the illustrated form of the invention, and as illustrated in FIGS. 2, 3, and 5, loader 10 further includes a seat bar 120 movable between a first operational position (FIGS. 2 and 3) and a second or nonoperational position (FIG. 5). When in an operational position, the seat bar 120 enables various functions of the loader 10. As will be appreciated, when the seat bar 120 is in a nonoperational position, various functions of the loader 10 are disabled. Preferably, suitable drivers 122, such as, extendable/retractable cylinders are provided between the cab enclosure 30 and the seat bar 120 to facilitate movement of the seat bar 120.

As shown in FIG. 2, the seat bar 120 is secured to the cab enclosure 30 for pivotal movement about a generally horizontal axis 128 defined by a pair of axially aligned pivot pins 130 and 132. According to the present invention, the latch mechanism 44 of the present invention is automatically urged into a locked position thereby inhibiting inadvertent vertical displacement of the cab enclosure 30 in response to the seat bar 120 being returned to its operational position.

A force transfer mechanism 136 operably interconnects the seat bar 120 with each lock assembly of latch mechanism 144. In the illustrated form of the invention, the force transfer mechanism includes a pair of cables 138 connected to each end of the seat bar 120 radially spaced relation from the pivot axis 128 and extending to the respective lock assemblies of the latch mechanism 44.

As shown in FIGS. 3 and 5, the cable 138 depends from its attachment to the seat bar 120 and is connected to the second end 74 of lever 68 of a respective lock assembly of latch mechanism 44. As shown in FIG. 6, an opening or hole 142 is defined in the top wall 78 of enclosure 76 to allow the cable 138 to pass endwise therethrough. Moreover, and as shown in FIGS. 3 and 5, cable 138 passes about a roller 144 to impart proper forces to the lever 68. As will be appreciated, when the seat bar 120 is moved from a nonoperational position (FIG. 5) into an operational position (FIG. 3), the force transfer mechanism 136 automatically and forcibly moves the lever 68 and thereby the locking element 62 connected thereto into operable engagement with the respective latch 52.

During operation of the loader 10, latch mechanism 44 of the present invention will maintain the cab enclosure 30 in an operable and fixed relation relative to the frame 12 of the loader 10. Providing a lock at opposite corners of the cab enclosure 30 allows the anchored cab enclosure to absorb energy and inhibits the cab enclosure 30 from moving relative to the frame regardless of which direction forces are applied thereto. Moreover, securing the opposed corners of the cab enclosure 30 to the frame provides a roll-over protective structure wherein each corner of the cab enclosure is attached to the frame 12 thus adding strength and rigidity to the cab enclosure 30.

An advantage of the present invention relates to the ability of the present invention to release the cab enclosure 30 from its secured relationship to the frame 12 of the loader 10 without use of tools. To release the latch mechanism 44 of the present invention, the operator uncouples each lock assembly of latch mechanism 44 by moving each locking element 62 such that the engaging surface 64 thereon is disposed to move past the stop surface 56 on a respective latch 52 when the cab enclosure 30 is pivotally moved to a tilt position thereby enhancing access to those portions or sections of the machine 10 normally inaccessible when the cab enclosure is in an operable position.

In the illustrated form of the invention, the locking element 62 of each lock of the latch mechanism is responsive to operation of the actuator 66. More specifically, rocking movement of the pivotal lever or handle 68 about its respective axis 86 will effect endwise displacement of the locking element 62. As mentioned above, however, inadvertent movement of each handle or lever 68 is inhibited by the detent arrangement provided on the enclosure 76. As such, adequate movement of the lever or handle 68 to effect release of the latch mechanism 44 must be purposeful otherwise the detent arrangement will prevent inadvertent displacement of the handle or lever 68 to a degree sufficient to release the latch mechanism 44 of the present invention. Upon adequate displacement of the locking element 62, the latch mechanism 44 of the present invention is released and the cab enclosure 30 can be moved to a nonoperational position thereby enhancing access to the machine components and systems normally inaccessible when the cab enclosure 30 is in an operable position. As is known, the seat bar 120 is normally raised from the position shown in FIG. 2 to allow the operator to raise from the seat 28.

When the cab enclosure 30 is returned to its operating position relative to the frame 12 with the loader 10, the cam structure 100 guides the cab enclosure 30 into position relative to the frame. As will be appreciated by those skilled in the art, positively guiding the cab enclosure 30 relative to the frame 12 will promote operation of the latch mechanism 44 by effecting proper alignment of the locking element 62 relative to the latch 52 of each lock assembly of the latch mechanism 44.

When the cab enclosure 30 is returned to its operational position, the operator can return to the seat 28 and effect securement of each lock of the latch mechanism 44. That is, upon returning to the seat 28 the operator manually moves the actuator 66 of each lock assembly of the latch mechanism 44 by rotating the handle 68 thereby causing linear displacement of the locking element 62. Sufficient displacement of the locking element 62 will result in the pin or locking element 62 passing through the throughbore 58 of latch 52. That is, when the actuator 66 of each lock assembly is conditioned to lock the latch mechanism 44, the engaging surface 64 of locking element 62 will pass beneath the stopping surface 56 of a respective latch 52 thereby preventing inadvertent vertical displacement of and thus securing the cab enclosure 30 to the frame 12 of the loader 10. Alternatively, when the operator returns to the seat 28 the seat bar 120 is moved into an operational position. The pivotal movement of the seat bar 120 likewise causes the force transfer mechanism 136 to automatically displace the actuator 66 thereby securing the locking element 62 to the latch 52 in the manner described above. Moreover, it is important to note that the cab enclosure is 30 locked in position without the use of tools.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A latch mechanism for a skid steer loader including a mobile frame, a cab enclosure mounted adjacent a first front end to said frame to allow pivotal movement of said cab enclosure about a generally horizontal axis extending across said frame between a first position, wherein said cab enclosure is disposed adjacent the frame, and a second position, wherein said cab enclosure is disposed to enhance access to portions of the frame substantially inaccessible when said cab enclosure is in said first position, said latch mechanism including a latch structure secured to said frame in spaced relation from said first end of said cab enclosure and a manually operated lock assembly disposed toward a rear end of said cab enclosure for movement therewith, said lock assembly including a locking element movable between a first position, wherein said locking element is operably coupled to said latch structure thereby inhibiting pivotal movement of said cab enclosure, and a second position, wherein said locking element is disengaged from said latch structure to permit pivotal movement of said cab enclosure.

2. The latch mechanism according to claim 1 wherein the latch structure of said latch mechanism includes a member fixedly secured to said frame exteriorly of a second end of said cab enclosure, said member defining a stopping surface thereon, and wherein said locking element of said lock assembly has an engaging surface engagable with said stopping surface on said member when said cab enclosure moves toward said second position and said locking element is disposed in said first position.

3. The latch mechanism according to claim 2 wherein said locking element is mounted for endwise sliding movement between a first position, wherein the stopping surface of said member lies in the path of the engaging surface on said locking element, and a second position, wherein the engaging surface of said locking element is remotely disposed relative to said stopping surface thereby permitting movement of the cab enclosure toward said second position.

4. The latch mechanism according to claim 3 wherein said lock assembly further includes an actuator for endwise moving said locking element between said first and second positions.

5. The latch mechanism according to claim 4 wherein said actuator of said lock assembly includes a pivotal lever having said locking element operably connected to one end thereof.

6. The latch mechanism according to claim 5 further including an apparatus for releasably holding said lever in a predetermined position to inhibit inadvertent movement of the locking element and thereby inhibiting inadvertent displacement of the cab enclosure from its first position adjacent the frame of the skid steer loader.

7. A latch mechanism for a skid steer loader including a mobile frame, a cab enclosure mounted adjacent a first end to said frame to allow pivotal movement of said cab enclosure between a first position, wherein said cab enclosure is disposed adjacent the frame, and a second position, wherein said cab enclosure is disposed to enhance access to portions of the frame substantially inaccessible when said cab enclosure is in said first position, said latch mechanism including a latch structure secured to said frame in spaced relation from said first end of said cab enclosure and a manually operated lock assembly carried on said cab enclosure for movement therewith, said lock assembly including a locking element movable between a first position, wherein said locking element is operably coupled to said latch structure thereby inhibiting pivotal movement of said cab enclosure, and a second position, wherein said locking element is disengaged from said latch structure to permit pivotal movement of said cab enclosure.

wherein said lock assembly is urged into said first position by a seat bar arranged in the cab enclosure of the skid steer loader.

8. The latch mechanism according to claim 1 further including an apparatus for guiding said cab enclosure into position relative to said frame when said cab enclosure is moved from said second position toward said first position.

9. A latch mechanism for releasably locking a roll over protective structure to a fore-and-aft extending frame of a skid steer loader without the use of tools, said protective structure being pivotally mounted adjacent a first end to said frame to allow for pivotal movement of said protective structure between an operating position, wherein said protective structure is adjacent the frame and defines an operator enclosure, and a nonoperative position, wherein said protective structure is disposed to enhance access to portions of the frame substantially inaccessible when said protective structure is in said operating position, said latch mechanism comprising a multipiece assembly including a first subassembly arranged on one end of said frame and said protective structure in spaced relation from the first end of said protective structure and a second subassembly mounted on the other of said frame and said protective structure for cooperative and releasable engagement with said first subassembly, and wherein in a first operating condition said first and second subassemblies are operably engageable with each other to inhibit pivotal movement of said protective structure relative to said frame, and wherein in a second operating condition said first and second subassemblies are operably disengaged from each other without the use of tools to permit said protective structure to be pivotally moved relative to the frame of the loader wherein a front end of said protective structure is mounted for movement about a generally horizontal axis extending across the frame, and wherein said latch mechanism is disposed toward a rear end of said protective structure.

10. The latch mechanism according to claim 9 wherein one of said first and second subassemblies includes a locking member movable between engaged and disengaged positions thereby conditioning said multipiece assembly to inhibit or allow for pivotal movement of said protective structure relative to said frame.

11. The latch mechanism according to claim 9 wherein the first subassembly of said latch mechanism includes a latch fixedly secured to said frame exteriorly of a second end of said protective structure, said latch defining a stopping surface thereon, and wherein the second subassembly of said latch mechanism includes a locking element having an engaging surface engagable with said stopping surface on said latch when said cab enclosure moves toward said second position and said latch mechanism is in said first operating condition.

12. The latch mechanism according to claim 11 wherein said locking element is mounted for endwise sliding movement such that when said first and second subassemblies are in said first operating condition the engaging surface of said locking element engages with said stopping surface, and when said first and second subassemblies are in said second operating condition the engaging surface of said locking element is remotely disposed relative to said stopping surface thereby permitting movement of the protective structure relative to the frame of the loader.

13. The latch mechanism according to claim 12 wherein said second subassembly further includes an actuator for endwise moving said locking element in response to manipulation of said actuator.

14. The latch mechanism according to claim 9 wherein the first subassembly of said latch mechanism includes a pair of latches spaced a predetermined operative distance apart from each other and fixedly secured to said frame exteriorally of a second end of said protective structure, each latch of said first subassembly defining a stopping surface thereon, and wherein the second subassembly of said latch mechanism includes a pair of locking elements spaced laterally apart from each other the same operative distance as said latches, each locking element having an engaging surface engagable with the stopping surface on a respective latch when said cab enclosure moves toward said second position and said latch mechanism is in said first operating condition.

15. The latch mechanism according to claim 14 wherein each locking element of said first subassembly is mounted for endwise sliding movement such that when said first and second subassemblies are in said first operating condition the engaging surface of locking elements of said second subassembly are disposed to engage the stopping surface of each latch of the first subassembly, and wherein when said first and second subassemblies are in said second operating condition the engaging surface of each locking element of the second subassembly is remotely disposed relative to said stopping surface of the latches of said first subassembly thereby permitting movement of the protective structure relative to the frame of the loader.

16. The latch mechanism according to claim 9 further includes a cam structure for guiding said protective structure into position relative to said frame when said cab enclosure is moved from said second position toward said first position.

17. A latch mechanism for releasably locking a roll over protective structure to a mobile fore-and-aft extending frame of a skid steer loader without the use of tools, with a first front end of said protective structure being mounted to said frame to allow said protective structure to be pivotally moved about a generally horizontal axis extending across the frame from an operational position, wherein said protective structure is adjacent to said frame, and a non operational position, wherein said protective structure is disposed to enhance access to portions of the frame substantially inaccessible with said protective structure in said operational position, and wherein said protective structure includes rigid vertical roll bars for providing strength and rigidity to the protective structure, said latch mechanism comprising a latch structure extending upwardly from and secured to said frame at a second end of said protective structure and a lock structure disposed toward a rear end of said protective structure for sliding endwise movement toward and away from said latch structure between a first position, wherein said lock structure is disposed for operable engagement with said latch structure to operably couple said protective structure to said frame thereby preventing pivotal movement of said protective structure from its operational position, and a second position, wherein said lock structure is releasably disengaged from said latch structure to allow for pivotal movement of said protective structure to said non operational position.

18. The latch mechanism according to claim 17 wherein said latch structure includes a member secured to said frame exteriorally of a rear end of said protective structure, said member defining a stopping surface thereon, and wherein said lock structure includes a locking element having an engaging surface that traverses a fixed path of movement when said protective structure is pivotally moved between positions, and wherein the stopping surface on said locking element engages with said stopping surface to prevent substantial vertical movement of the protective structure on said member after said lock structure is disposed in said first position.

19. The latch mechanism according to claim 17 wherein when said latch structure is in said first position the engaging surface of said locking element engages with said stopping surface of said latch member, and when said latch structure is in said second position the engaging surface of said locking element is remotely disposed relative to the stopping surface of the latch member thereby permitting movement of the protective structure relative the frame of the loader.

20. The latch mechanism according to claim 18 wherein said lock structure further includes a manually operated actuator for endwise moving said locking element in response to manipulation of said actuator.

21. The latch mechanism according to claim 17 wherein said latch structure includes a pair of latch members spaced apart from each other and fixedly secured to said frame exteriorly of a second end of said protective structure, with each latch member of said latch structure defining a stopping surface thereon, and wherein said lock structure includes a pair of locking elements spaced apart from each other the same operative distance as said latch members, each locking element having an engaging surface engageable with the stopping surface on a respective latch member when said protective structure moves toward said second position and said lock structure is in said first position thereby preventing substantial movement of said protective structure from said operational position.

22. The latch mechanism according to claim 21 wherein when said lock structure is in said first position the engaging surface of the locking elements of said lock structure are disposed to engage the stopping surface of the latch members of the latch structure, and wherein when said lock structure is in said second operating condition the engaging surface of the locking elements of said locking elements are remotely disposed relative to the stopping surface of the latch members of said latch structure thereby permitting movement of the protective structure relative the frame of the loader.

23. The latch mechanism according to claim 17 further including a cam structure for guiding said protective structure into position relative to said frame when said cab enclosure is moved from said second position toward said first position.

24. In combination with a skid steer loader including a mobile frame, a roll over protective structure mounted to the frame in surrounding relation relative to a cab area defined by an operator seat from which various functions of the loader are controlled, said protective structure being mounted at a first end to the frame to allow pivotal movement of the protective structure between a first position, wherein said protective structure is adjacent the frame, and a second position, wherein said protective structure is pivotally moved to permit access to areas of the loader substantially inaccessible when the protective structure is in said first position, said loader further includes a seat bar movable between an operational position, wherein various functions of the loader are enabled, and a non operational position, wherein the various functions of the loader are disabled, and a latch mechanism for releasably locking said protective structure to said frame without the use of tools and is responsive to movement of said seat bar.

25. The skid steer loader according to claim 24 wherein said latch mechanism includes latch structure secured to said frame in spaced relation relative to the first end of said protective structure and a locking mechanism carried with said protective structure and operably engagable with said latch structure thereby locking said protective structure against substantial pivotal movement relative to the frame of the skid steer loader.

26. The skid steer loader according to claim 25 wherein the latch structure of said latch mechanism includes a member fixedly secured to said frame exteriorly of a second end of said cab enclosure, said member defining an aperture, and wherein said lock mechanism includes a locking element movably mounted between a locked position and an unlocked position, and wherein said locking element extends through said aperture when in said locked position thereby preventing said protective structure from substantially moving relative to said frame, and wherein said locking element is removed from said member when in said unlocked position thereby permitting movement of said protective structure relative to said frame of the skid steer loader.

27. The skid steer loader according to claim 26 wherein said lock mechanism further includes an actuator for moving said locking element between said locked and unlocked positions.

28. The skid steer loader according to claim 27 wherein said actuator of said lock mechanism includes a pivotal lever having said locking element operably connected to one end thereof.

29. The skid steer loader according to claim 28 wherein said protective structure further includes a structure for releasably holding said lever in a predetermined position to inhibit inadvertent movement of the locking element and thereby inhibiting inadvertent displacement of the protective structure from its first position adjacent the frame of the skid steer loader.

30. The skid steer loader according to claim 25 wherein the latch structure of said latch mechanism includes a pair of latch members fixedly secured to said frame exterioraly of a second end of said cab enclosure in spaced relation relative to each other, each latch member defining an aperture, and wherein said lock mechanism includes a pair of locking elements carried on the protective structure with a distance equal to the distance separating the latch members therebetween, each locking element being movably mounted between a locked position and an unlocked position, and wherein each locking element extends through the aperture of a respective latch member when in said locked position thereby preventing said protective structure from substantially moving relative to said skid steer loader frame, and wherein said locking element is removed from the respective latch member when in said unlocked position thereby permitting movement of said protective structure relative to said frame of the skid steer loader.

31. The skid steer loader according to claim 30 wherein each locking element of said lock mechanism has an actuator operably associated therewith for moving said locking element between said locked and unlocked positions.

32. The skid steer loader according to claim 31 wherein the actuators of said lock mechanism each include a pivotal lever having said locking element operably connected to one end thereof.

33. The skid steer loader according to claim 32 wherein said protective structure further includes structure for releasably holding each lever of said locking mechanism in a predetermined position to inhibit inadvertent movement of the respective locking element and thereby inhibiting inadvertent displacement of the protective structure from its first position adjacent the frame of the skid steer loader.

34. The skid steer loader according to claim 33 further including an apparatus for guiding said cab enclosure into position relative to said frame when said cab enclosure is moved from said second position toward said first position.

35. The skid steer loader according to claim 24 further including a force transfer mechanism for interconnecting said seat bar to said latch mechanism.

36. The latch mechanism according to claim 24 further including an apparatus for guiding said cab enclosure into position relative to said frame when said cab enclosure is moved from said second position toward said first position.

37. A latch mechanism for releasably locking a roll over protective structure to a frame of a skid steer loader without the use of tools, said protective structure being pivotally mounted adjacent a first front end to said frame to allow for pivotal movement of said protective structure about a generally horizontal axis extending across the frame between a first position, wherein said protective structure is adjacent the frame, and a second position, wherein said protective structure is disposed to enhanced access to portions of the frame substantially inaccessible when said protective structure is in said first position, wherein said latch mechanism is disposed toward a rear end of said protective structure and comprises a multipiece assembly including said latch structure arranged on and extending upwardly from the frame in spaced relation from the first end of said protective structure and lock structure mounted on the protective structure, said lock structure including a slidable pin movable into and out of engagement with said latch structure for releasably locking said protective structure to said frame, said pin being movable into and out of engagement with said latch structure through manipulation of a manually operated mechanism carried on the protective structure.

38. The latch mechanism according to claim 37 wherein said manually operated mechanism includes an actuator carried on the protective structure for endwise slidably moving said pin into and out of engagement with said latch structure.

39. The latch mechanism according to claim 38 wherein said actuator includes a pivotal lever mounted on said protective structure.

40. The latch mechanism according to claim 39 wherein said protective structure defines a detent for releasably accommodating and holding said lever in a position wherein said slidable pin is held in engagement with said latch structure.

41. The latch mechanism according to claim 40 wherein said lever is biased under the influence of a spring mechanism into operable engagement with said detent whereby purposeful movement of said lever must be effected to release said slidable pin from engagement with said latch mechanism thereby allowing for movement of the protective structure from said first position.

42. A skid steer loader including a mobile fore-and-aft extending frame, a roll over protective structure mounted to the frame in surrounding relation relative to an operator station, said protective structure being mounted at a forward end thereof for pivotal movement about a generally horizontal axis extending across the frame between an operational position, wherein said protective structure is adjacent to the frame of the skid steer loader, and a non operational position, and wherein said protective structure is positioned to enhance access to areas of the frame inaccessible when said protective structure is in said operational position, and a latch mechanism is disposed toward a rear end of said protective structure including two assemblies that coact with each other to releasably hold the protective structure in said operative position relative to said frame, and a mechanism for effecting alignment of the cab enclosure relative to said frame thereby promoting operation of said latch mechanism.

43. The skid steer loader according to claim 42 further comprising dual cams for effecting alignment of the cab enclosure relative to said frame as said roll over protective structure moves from said non operational position to said operation position, wherein said two assemblies include two guides upwardly projecting from and fixedly secured to said frame of the skid steer loader, wherein the said protective structure includes vertical roll bars at opposite corners thereof, and cooperative surfaces arranged toward the lower ends of the roll bars for slidably accommodating said pins for endwise passage therethrough.

44. The skid steer loader according to claim 43 wherein a free end of each guide is configured to promote guiding movement of a respective cooperative surface therepast.

45. A skid steer loader including a mobile frame, a cab enclosure, a roll over protective structure mounted to the frame in surrounding relation relative to an operator station and including vertical roll bars at opposite corners thereof, said protective structure being mounted at a forward end thereof for pivotal movement about a generally horizontal axis extending across the frame between an operational position, wherein said protective structure is adjacent to the frame of the skid steer loader, and a non operational position, wherein said protective structure is positioned to enhance access to areas of the frame inaccessible when said protective structure is in said operational position and a cam mechanism is disposed toward a rear end of said protective structure for effecting alignment of the cab enclosure relative to said frame as said roll over protective structure moves from said non operational position to said operation position.

46. The skid steer loader according to claim 45 wherein said cam structure includes a pair of laterally spaced upstanding guides secured to the frame of the loader and a pair of guiding surfaces arranged in cooperative relationship with said guides and carried by said roll bars of said protective structure for guiding said protective structure into predetermined position relative to said loader frame.

* * * * *